United States Patent [19]
Turner

[11] Patent Number: 6,002,326
[45] Date of Patent: Dec. 14, 1999

[54] AUTOMOTIVE VEHICLE ANTI-THEFT AND ANTI-VANDALISM AND ANTI-CARJACKING SYSTEM

[75] Inventor: Valerie Jean Turner, Compton, Calif.

[73] Assignee: Valerie Turner, Compton, Calif.

[21] Appl. No.: 08/899,473

[22] Filed: Jul. 22, 1997

Related U.S. Application Data

[63] Continuation-in-part of application No. 08/308,271, Sep. 19, 1994, abandoned.

[51] Int. Cl.$^6$ ..................................................... B60R 25/10

[52] U.S. Cl. ......................... 340/426; 180/287; 307/10.2; 340/937; 348/148; 348/152

[58] Field of Search .................................... 340/426, 429, 340/937; 348/113, 143, 148, 151, 152, 153, 154, 155; 180/287; 307/10.2

[56] References Cited

U.S. PATENT DOCUMENTS

| | | | |
|---|---|---|---|
| 5,027,104 | 6/1991 | Reid | 340/426 |
| 5,223,844 | 6/1993 | Mansell et al. | 342/457 |
| 5,334,974 | 8/1994 | Simms et al. | 340/426 |
| 5,515,043 | 5/1996 | Berard et al. | 340/426 |
| 5,515,285 | 5/1996 | Garrett, Sr. et al. | 340/426 |

*Primary Examiner*—Brent A. Swarthout

[57] ABSTRACT

An automotive vehicle anti-theft anti-vandalism and anti-carjacking system utilizing both an audible alarm and visual monitor system for reducing the incidence of theft or vandalism of an automotive vehicle and an emergency alarm device in connection with an emergency alarm station for preventing carjacking or emergency type situation involving the vehicle or the individuals of the vehicle. The alarm and monitor system comprises one or more video cameras mounted within a vehicle and which are adapted for scanning movement by means of a simple oscillating scanning motor. The video camera is equipped with an emergency alarm device designed to signal the emergency alarm station of an emergency type situation. The emergency alarm station comprises video monitor operators responsible for monitoring and handling an emergency situation then informing a 911 emergency station and video monitor units which are capable of receiving signals from the emergency alarm device for tracking and video recording an emergency situation involving the individuals of the vehicle or the vehicle itself. Motion or vibration sensors are also mounted on the vehicle in selected locations to detect movement of the vehicle or activity in proximity to the vehicle beyond a certain threshold level. A remote unit containing a video screen is also provided for viewing the actual conditions or emergency surrounding the automotive vehicle, as detected by one or more of the video cameras. The remote unit is also equipped with an emergency alarm device for a quick response to any emergency situation. The system also includes a tracking mechanism upon emergency situation the tracking mechanism could cause the cameras to rotate a separate path to view second display signs scenery and or building for tracking purposes.

7 Claims, 2 Drawing Sheets

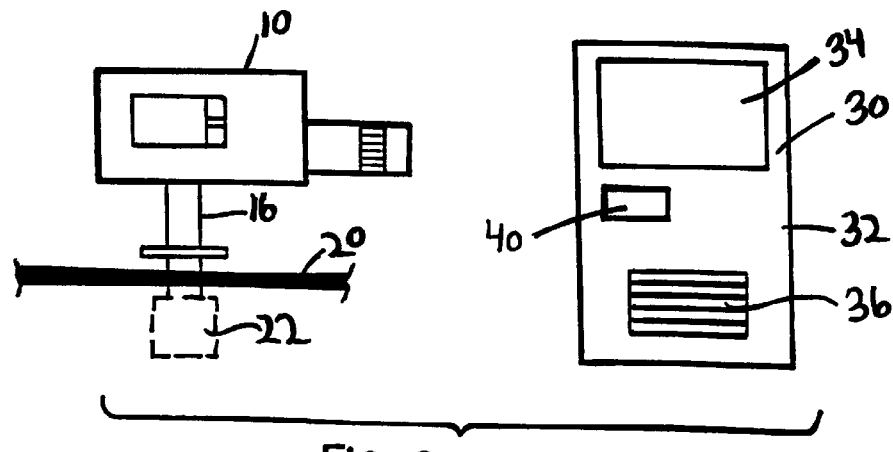
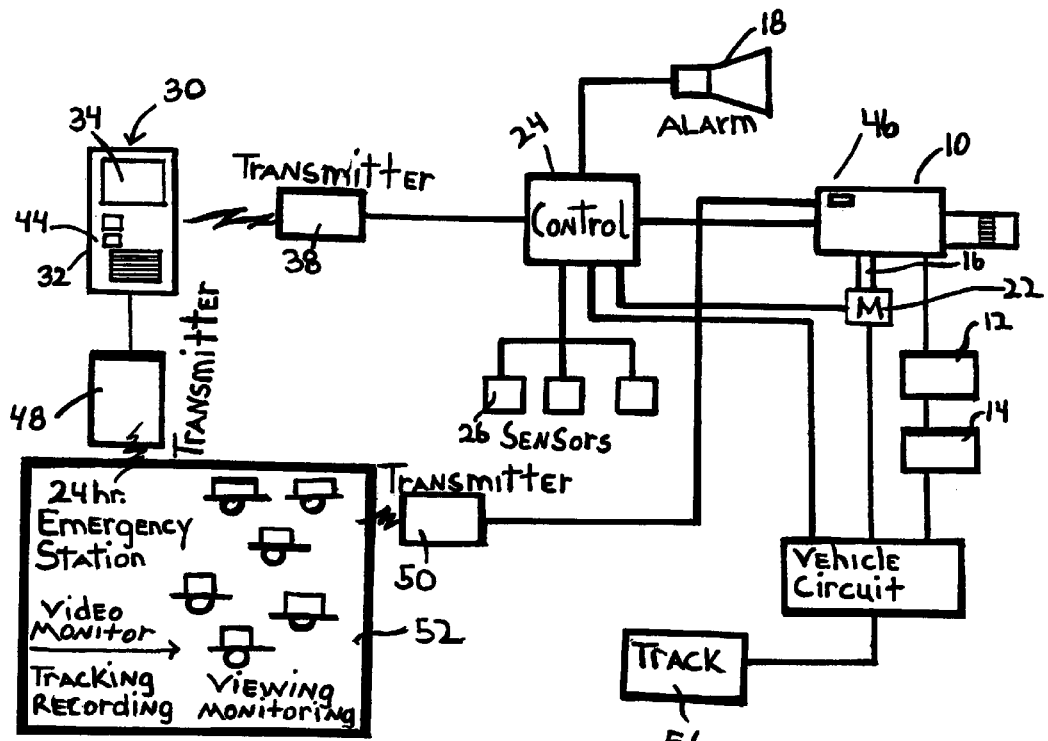

AUTOMOTIVE VEHICLE ANTI-THEFT AND ANTI-VANDALISM AND ANTI-CARJACKING SYSTEM

This is a continuation-in-part of Ser. No. 08/308,271 filed Sep. 19, 1994, now abandoned.

BACKGROUND OF THE INVENTION

1. Field of the Invention

This invention relates in general to certain new and useful improvements in automotive vehicle anti-theft systems and more particularly, to an automotive vehicle alarm and monitor system which enable the monitoring of potential theft or vandalism of the vehicle and an associated alarm which alerts a user to potential incidence of theft or vandalism and in connection with an emergency alarm device that activate an alarm and video signal to a 24 hr. emergency alarm station upon an attempted carjacking or emergency situation.

2. Brief Description of the Prior Art

In recent years, the incidence of automotive vehicle theft has increased dramatically, particularly with the availability of very high-cost automotive vehicle. For example, in recent years, it is not uncommon to find numerous automotive vehicle where the sales cost easily exceeds $50.000.00 to $100.000.00. As a result, there has been an increasingly available black market for stolen automotive vehicle which may be either resold or otherwise stripped for parts.

In addition to the increase in theft, there has also been a substantial increase in the amount of vandalism to automotive vehicles. While the precise cause of the vandalism are relatively uncertain, the fact remains that there has been a substantial increase of vandalism associated with many vehicle giving rise in increased number of insurance clams and higher insurance premium costs.

The latest technique used in automotive vehicle theft has been the terrifying force of carjacking. Carjackers are forcing the owner or user of the automotive vehicle to give up possession thereof, usually by means of a weapon of some kind. Therefor, causing the owner or user of the vehicle in fear for their life, unfortunately, in many cases it has cost them just that, their lives.

In order to reduce the incidence of automotive vehicle theft and vandalism, there have been numerous proposed alarm systems and to my knowledge, there has not been any attempts for anti-carjacking systems.

Most of these alarm systems operate on the basis of a vibration sensor or similar sensor which will detect the presence of a person attempting to open the vehicle or otherwise unauthorized movement of the vehicle. In many cases, the automotive vehicle alarm systems are not effective because the owner or user of the vehicle is located in a remote location. As a simple example, if a vehicle is in a parking lot, it is virtually impossible for the owner or user of the vehicle to hear a generated alarm. While the alarm itself may attract passerby population, the average thief can still start the vehicle and drive away before anyone assumes the presence of mind to call a peace officer or otherwise, take some positive action.

Notwithstanding the foregoing, even if the owner or the user of an automotive vehicle was in close enough proximity to hear a vehicle alarm, this owner or user is frequently unaware if that alarm is one from his or her vehicle. Due to the fact that many automotive vehicles are equipped with alarm systems, it is virtually impossible to determine if the sound of that alarm emanates from the owner's or user's vehicle or another vehicle. Indeed, with some automotive manufacturers, it has become a common practice to install an alarm system as part of the factory equipment on certain of their models. This only exacerbates the problem in determining if the alarm emanated from a particular vehicle.

In many cases, when the user of a vehicle hears an alarm, and even if the user or owner is able to recognize that alarm as emanating from his or her vehicle, this owner or user often does not exercise immediate urgency to investigate the condition of the vehicle based on the realization that in many cases, slight inadvertent contact by another automotive vehicle can set off the alarm. Thus, the user will casually finish a task which was being performed and then attend to the automotive vehicle without any particular rush. It would, of course, be desirable for the user to know if the condition which initiated the alarm was an actual theft condition, or a vandalism, or otherwise, an inadvertent triggering of the alarm, However, all present alarm system are incapable of enabling the user or owner to detect the environment surrounding the vehicle.

Furthermore, an automotive vehicle having an emergency alarm device, in connection with an 24 hr. emergency alarm station, which responsibilities are for monitoring, tracking, and recording any type of emergency situations, then informing the 911 emergency station thereof, would reduce, if not prevent, criminal acts such as, carjacking and emergency situations.

If the owner or user of an automotive vehicle is in moving position of the vehicle and an attempted carjacking or emergency is actually about to occur, then, before the violator approaches the user of the vehicle, he or she would activate the emergency alarm device to signal the emergency station. If the automotive vehicle is in a still position and an attempted vandalism or emergency is actually occurring and the user of the vehicle is not in proximity to the vehicle, he or she would activate the emergency alarm device from the remote unit to signal the emergency station. In such case of a false alarm the monitoring operator would simply disconnect.

Automotive vehicle carjacking and emergency situations involving both the individuals and the vehicle itself, are increasing rapidly. However, there are no attempts for prevention. It would then be desirable, for the owner or user of an automotive vehicle to feel secure knowing 24 hr. security is around them and the vehicle at all times, and for the violator to stop all criminal acts, and to be aware that they are being watched and signaled to another station.

OBJECTS OF THE INVENTION

It is therefore, one of the primary objective of the present invention to provide an automotive vehicle alarm and monitor system which enables a user of the system to monitor the conditon of the vehicle while at a remote location and a secondary objective of the present invention an associated alarm device in connection with a 24 hr. emergency alarm station that would transmit second alarm and second video signals and monitor an emergency situation at another remote location then inform the 911 emergency station while tracking and recording an emergency until authorities take over.

It is another object of the present invention to provide an automotive vehicle alarm and monitor system in connection with a 24 hr. emergency station of the type stated that will permit the monitoring of the condition surrounding the vehicle or the individuals of the vehicle as well as the generation of an alarm in the event of tampering with the vehicle or upon carjacking or emergency situations.

And monitor system in connection with a 24 hr. emergency station of the type stated which can be remotely controlled from a remote unit or an emergency alarm device and which permits monitoring at a remote site.

It is an addition object of the present invention to provide an automotive vehicle alarm and monitor system in connection with a 24 hr. emergency station of the type stated which can be constructed at a relatively reasonable unit cost, but which is, nevertheless, highly effective in reducing, if not eliminating, the incidence of theft, vandalism and carjacking of an automotive vehicle.

It is still another object of the present invention to provide a method of reducing the incidence of theft and vandalism of an automotive vehicle by providing both first alarm and first video signals and where the alarm signals and video signals can be generated at a remote site.

It is still a further object of the present invention to provide a method of reducing an incidence of carjacking of an automotive vehicle by providing both second alarm and second video signals and where the second alarm signals and second video signals can be generated at a remote site.

Another object of the present invention is to provide a system of the type stated that will permit second controlled tracking mechanism upon an emergency situation.

It is also another object of the present invention is to provide 24 hr. security for emergency type situations.

With the above and other objects in view, my invention resides in the novel feature of form, function: construction, arrangement and combination of parts presently described and pointed in the claims.

BRIEF SUMMERY OF THE DISCLOSURE

The present invention relates in general to an audible and visual automotive vehicle anti-theft anti-vandalism and anti-carjacking system. This system primarily relies upon the use of both first audible messages and first visual messages which can be transmitted to a remote location where the owner or user of the vehicle may be located and for apprising this owner or user of the condition of the vehicle and particularly an attempted theft or vandalism. The system associated with an 24 hr. emergency alarm station would also rely upon the use of tracking mechanism and both second audible messages and second visual messages which an be received from a remote location where the owner or user of the vehicle apprises the emergency station monitoring operator by actuating the emergency alarm device upon an attempted carjacking or emergency situation involving the individuals of the vehicle and the vehicle itself, having this monitoring operator responsible for viewing, monitoring, recording and tracking the situation, then informing the 911 emergency station thereof.

In a more specific form, the present invention relies upon one or more video cameras which are mounted in the vehicle for scanning the vehicle and surrounding environment. In a preferred embodiment, the scanning video camera is mounted within the vehicle so as to preclude theft of the cameras itself. In addition, the camera is mounted on an oscillating electric motor assembly which is powered for movement of the camera to scan a selected area. A gear reducing mechanism is connected to the motor in order to provide a proper scanning rate of speed.

In another addition, this system also relies upon an emergency alarm device that is located on the video camera and the remote control unit or perhaps in the vehicle front paneling area for the owner or user of the vehicle to have immediate access. Preferably the alarm device is electrically constructed so that when the user of the vehicle would activate the switch upon an attempted carjacking or emergency situation, this will cause a transmitting alarm signal at the emergency station.

The anti-theft anti-vandalism and anti-carjacking system of the invention is also provided with sensors suitably mounted in the vehicle to either detect motion surrounding the vehicle or vibration of the vehicle and preferably for detection of vibration of the vehicle.

The motion sensors are set so that they will be actuated with a minimum predetermined threshold vibration level. When vibration or other motion exceeds this predetermined threshold level, the motion sensors will cause the generation of first audible alarm. This first audible alarm may occur either at the vehicle or be generated at a remote site, as hereinafter described.

The anti-theft anti-vandalism and anti-carjacking system of the present invention also comprises a remote control unit often referred to as a "monitor" and which includes a raster pattern screen, such as a small television screen, for receiving video images generated by the scanning camera or cameras. The remote control monitor also includes first alarm which is energized when the sensors at the vehicle generates an audible alarm. In this way, if the owner or user of the vehicle is at a remote location or is not within eyesight of the vehicle, he or she can then immediately inspect the images obtained by the scanning video camera. The remote control monitor also includes an emergency alarm device which can be activated by the user of the vehicle upon an attempted carjacking or emergency situation to signal a second audible alarm at the emergency alarm station being at another remote site.

The present invention is often referred to as both an alarm and monitor system since the invention is effective for generating both an audible alarm and a video images of the individuals of the vehicle and the vehicle itself and also the environment immediately surrounding the vehicle. In accordance with this system and the method of use associated therewith, it can be seen that the user of this anti-theft anti-vandalism and anti-carjacking system is capable of determining the condition of his or her vehicle and the potential for a theft or vandalism of his or her vehicle. Also, it can be known that the user of this anti-theft anti-vandalism and anti-carjacking system is provided with 24 hr. security that is capable of handling any emergency type situation until proper authorities take over.

The present invention also is an effective deterrent in that the average vehicle thief or criminal will avoid any attempt of theft vandalism and carjacking or any emergency situation involving the individuals of the vehicle or the vehicle or a portion of the vehicle due to the fact that this thief and his or her activities will be recorded and observed.

Furthermore the second controlled tracking mechanism would track the automotive vehicle upon an emergency situation 3 to 5 minutes after the emergency alarm device is activated. Causing the camera or cameras to second display signs, scenery and or buildings. This is also an effective deterrent to reduce if not prevent stripping of automotive parts or the like.

The present invention thereby provides an automotive vehicle alarm and monitor system which effectively reduces theft vandalism carjacking or emergency situation involving the individuals of the vehicle and the vehicle itself and which thereby fulfills all of the objects and advantages which have been sought therefor. While this anti-theft anti-vandalism and anti-car-jacking system is more fully illustrated in the accompany drawings and more fully described in the following detailed description, it should be understood that the following detailed description and the accompany drawings are set forth only for purposes of illustrating the general principles of the invention and are not to be taken in a limiting sense.

BRIEF DESCRIPTION OF THE DRAWINGS

Figure 1:
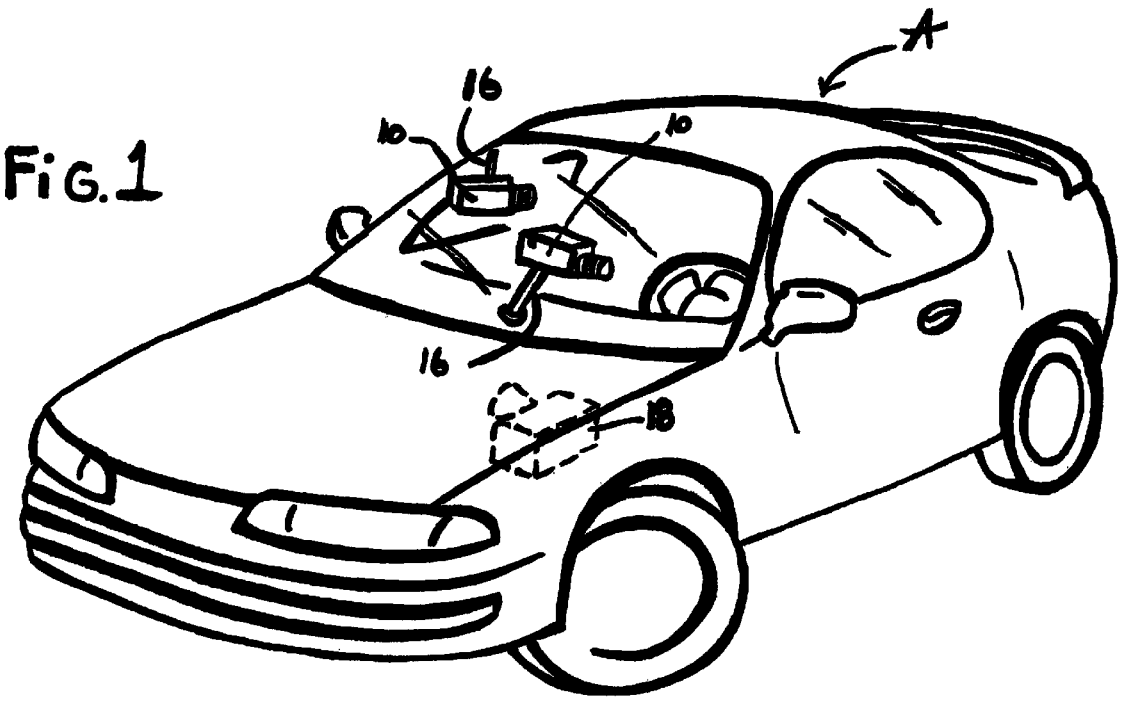
Figure 2:
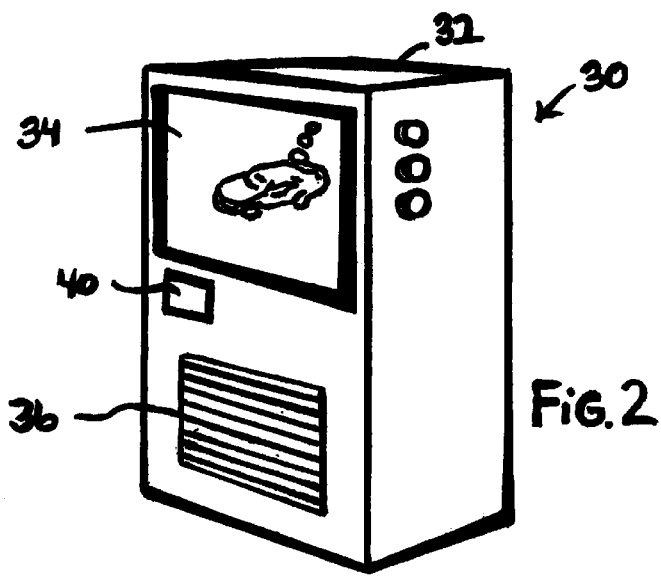

Having thus described the invention in general terms, reference will now be made to the accompanying drawings (two sheets) in which:

FIG. 1 is a perspective view showing a portion of an automotive vehicle equipped with the visual automotive vehicle anti-theft anti-vandalism and anti-carjacking system constructed in accordance with and embodying the present invention;

FIG. 2 is a perspective view of a monitor used in connection with and forming part of the anti-theft anti-vandalism and anti-carjacking system of FIG. 1;

FIG. 3 is a fragmentary side elevational view showing a portion of a detachable video camera and scanning motor, as well as a remote monitor used in and forming part of the automotive vehicle anti-theft anti-vandalism and anti-carjacking system of the present invention; and FIG. 4 is a schematic view showing the operative arrangement of the major components forming part of the automotive vehicle anti-theft anti-vandalism and anti-carjacking system of the present invention and in connection with an emergency alarm station and forming part of the automotive vehicle anti-theft anti-vandalism and anti-carjacking system of the present invention.

DETAILED DESCRIPTION OF A PREFERRED EMBODIMENT

Referring now in detail and by reference characters to the drawings which illustrate a preferred embodiment of the present invention. A designates an automotive vehicle which is equipped with the automotive vehicle anti-theft anti-vandalism and anti-carjacking system of the present invention. In this case, the invention is illustrated as being employed in connection with a passenger automotive vehicle. However, the anti-theft anti-vandalism and anti-carjacking system of the invention can be used with essentially any type of vehicle, including, for example, boats, trucks, airplane, motorhomes, etc. Thus, the term "vehicle" is used in a very broad sense to include any type of powered transport device.

The automotive vehicle anti-theft anti-vandalism and anti-carjacking system of the present invention comprises one or more video cameras 10 which are operatively mounted in the vehicle itself. In a preferred mode, and in order to prevent thief or vandalism of the camera or cameras, it is preferable to mount the cameras within the interior of the vehicle so that the vehicle can be locked and thereby essentially preclude damage or theft of the camera or cameras.

The cameras 10 are essentially conventional in construction and generally comprise one or more known video cameras which are usually operable either from a battery source of power or from electrical outlets, such as a a 110 volt household current electrical outlet. In a preferred embodiment of the invention, the cameras 10 are operable from the electrical power system of the automotive vehicle. For this purpose, the cameras 10 are connected to the vehicle's electrical circuitry through a conventional transformer 12 and rectifier circuit arrangement 14.

In FIG. 1, it can be observed that a pair of cameras 10 are employed in the automotive vehicle A. These cameras 10 are conventionally mounted on support arms 16 for either suspension from a ceiling of the vehicle or support on another fixed portion of the vehicle, it should be understood, however, that while two cameras are illustrated, either one or two or any other number of cameras could be employed as may desired.

Also mounted within the vehicle, and preferably in the engine compartment thereof, is a conventional alarm device 18. Any type of alarm device capable of generating a loud audible alarm, such as a siren, horn or the like, may be employed for this purpose.

Referring to FIG. 3, it can be observed that a pair of video cameras 10 are used in the vehicle. Since each cameras and the operating assembly therefor are substantially identical, only one such camera 10 is more fully illustrated and described herein. The camera 10 is mounted on a suitable support arm 16, as aforesaid, and has a portion extending through a structural member 20 forming part of the automotive vehicle A. The arm 16 is connected to a scanning motor 22, which causes an oscillating or rotating movement of the camera 10, as illustrated, In this case, the structural member 20 forming part the vehicle A may, for example, may be that of the dashboard of the vehicle.

The scanning motor 22 may preferably be an oscillating motor which causes oscillatory rotation of the support arm 16 and hence the camera 10 in order to enable a scanning thereof otherwise, the motor 22 could be connected to a separate gear mechanism (not shown) for causing such movement.

As the electric scanning motor 22 is energized, the camera 10 will cause a scanning movement, that is, it will oscillate back and forth in a scanning path. If desired, the camera 10 could be designed for complete rotations. The position of the camera is established so that it can obtain an optimum view of first displayed conditions surrounding the vehicle in a full 360 path, or otherwise, a selected arcuate path. In the event that the scanning camera 10 does not rotate a full 360, it would then be desirable to employ the second camera in combination with the first camera.

The scanning camera or cameras 10, in and of themselves, will not generate any alarm. However, they will operate in conjunction with a control circuit 24 which will cause the generation of an alarm when one or more sensors 26, hereinafter described, are tripped. The control circuit 24 may be a relatively simple control circuit and, for that matter, it may be microprocessor operated circuit. The circuit is designed to cause energization of the motor 22 and energization of the camera 10 upon certain conditions as, for example, vibration of the vehicle which exceeds a predetermined threshold level.

The vehicle is provided with the one or more vibration sensors 26 (as shown in FIG. 4) which are mounted on the vehicle. These sensors 26 may adopt the form of either vibration detectors or motion detectors, or the like. When the vehicle is subjected to any type of vibration or motion, the sensors 26 will cause a triggering of the control circuit 24 to energize the cameras 10 and the scanning motor 22.

In FIG. 4, it can be observed having a track mechanism 56 in connection to the vehicle's electrical circuitry. This track mechanism 56 would operate in conjunction with cameras 10 to signal a second audible alarm at the emergency alarm station video monitor 52 electrical circuitry (not shown) and would be actuated only by the user of the vehicle actuating the emergency alarm device. Therefor, when the emergency alarm device signal second audible alarm the emergency alarm station 52, the video monitor operator would monitor the tracking causing camera 10 to rotate to a separate path to view second display signs, scenery and or buildings then inform a 911 emergency station thereof. It should be understood, that the illustration of the track mechanism 56, in connection to the vehicle electrical circuitry can be operated separately and manually from the vehicle's electrical circuitry of the host.

Again in FIG. 4, the camera 10 can also be observed having an emergency alarm device 46. However, it should be understood that although the camera 10 illustrates the emergency alarm device, this emergency alarm device can also be located in the interior of the vehicle, preferably in the front paneling of the vehicle for immediate access and control. The camera 10 in association with an emergency alarm device 46 is provided with an transmitter 50 of conventional structure which would operate in conjunction with a video monitor receiver (not shown) at the emergency alarm station 52. The emergency alarm device 46 and the transmitter 50 is designed to operate separately and manually from the vehicle's electrical circuitry of the host, therefore, if the vehicle generate first audible alarm, this alarm will not signal the emergency alarm station 52, this emergency alarm device transmitting second audible alarm signal is actuated only by the individual of the vehicle upon an attempted carjacking or emergency situation.

The anti-theft anti-vandalism and anti-carjacking system of the present invention is also comprised of a remote monitor unit 30 which is more fully illustrated in FIG. 3 of the drawings.

This remote monitor unit 30 comprises an outer housing 32 having a video screen 34 mounted on the face thereof This video screen 34 forms part of a conventional video receiver, (not shown) and located within the housing 32. In addition, the outer housing 32 is provided with a speaker 36 for audibly presenting any alarm which might be generated by the vehicle. For this matter, the speaker 36 may actually constitute part of an alarm unit which is energized by a signal from the vehicle when vibration exceeds a predetermined threshold level. Otherwise, the speaker 36 could be part of a receiver which receives a transmitted signal from the vehicle itself.

The remote monitor unit 30 may be provided with a warning light in place of, or in addition to the speaker 36 for providing a warning signal. In addition, the remote monitor monitor unit 30 could be provided with other features as, for example, the ability to enable two-way communication to the vehicle. The vehicle itself is provided with a transmitter 38 of conventional structure. This transmitter 40 would operate in conjunction with a receiver (not shown) but located within the interior of the outer housing 32.

The outer housing 32 is also provided with one or more control switches, such as an on/off switch 40. In accordance with this construction, if the vehicle is subjected to motion or vibration exceeding a predetermine threshold level, a first alarm signal will be energized, both at the vehicle itself by virtue of the alarm 18 and first alarm signal will be transmitted to the remote motor unit 30. In that case, the user of the system can immediately turn on the remote monitor unit 30 to view first display and examine the conditions surrounding the vehicle. In effect, there is no "false alarm" since the user would only hear the alarm system of his or her vehicle and would immediately examine the condition surrounding that vehicle by receiving the remote monitor system unit.

The remote monitor unit 30 comprises an emergency alarm switch 44 located on the outer housing 32, having a transmitter 48 which enables the ability to transmit second audible alarm to the emergency alarm station 52, video monitor unit (not shown).

The transmitter 48 would also operate in conjunction with a video monitor receiver (not shown) at the emergency alarm station. It should also be known that the transmitter 48 would operate separately and manually from the transmitter 40, and transmitter 38 of the vehicle, for this matter, if the sensors trigger the control circuit 24 to energize the remote monitor unit 30 and generate first audible alarm, this will not signal the emergency alarm station 52 monitor video unit. The individual of the vehicle has control to activate the emergency alarm switch 44 and transmit second audible alarm 48 at the emergency alarm station only upon an attempted carjacking or emergency situation.

Thus, there has been illustrated and described a unique and novel vehicle anti-theft anti-vandalism and anti-carjacking system which is effective an reducing the incidence of theft vandalism or carjacking of an automotive vehicle and emergency situation involving the individuals of the vehicle. The present invention thereby fulfills all of the objects and advantages which have been sought. Therefor, it should be understood that many changes, modifications, variations and other uses and applications which do not depart from the spirit and scope of the invention, are deemed to be covered by the invention which is limited only by the following claims:

Having thus described my invention, what I desire to claim and secure by Letters Patent is:

1. An automotive vehicle anti-theft anti-vandalism and anti-carjacking system in connection with a 24 hour emergency alarm station including a remote monitor unit which receives audio and video inputs from the vehicle and communications from said remote monitor unit to reduce vehicle theft vandalism and carjacking in an emergency situation involving the vehicle and the individuals of the vehicle and which provides a tracking mechanism, said automotive vehicle anti-theft anti-vandalism and anti-carjacking system in connection with a 24 hour emergency alarm station comprising:

a) a 24 hour emergency alarm station in connection with an automotive vehicle comprising video monitors and video monitor operators at a remote site in a designated building having responsibility for recording and viewing or tracking and monitoring an emergency situation involving the vehicle or individuals of the vehicle and then informing a 911 emergency station thereof;

b) video means operatively associated with a vehicle emergency alarm device in connection with said 24 hour emergency alarm station video monitors for generating a video image of the vehicle or individuals of the vehicle at said 24 hour emergency alarm station video monitors;

c) display means operatively associated with said 24 hour emergency alarm station video monitors and said remote monitor unit to display a portion of the vehicle or individuals of the vehicle involving an attempted carjacking or emergency situation;

d) means associated with the video means and emergency alarm device for transmitting a video image and audible alarm signal to said 24 hour emergency alarm station video monitors for alerting the video monitor operation of an attempted carjacking or emergency situation;

e) alarm means operatively associated with the vehicle for generating an audible alarm at the vehicle when at least one vehicle sensor is triggered by sensing an attempted vehicle theft condition;

f) said emergency alarm device including a transmitter located within the vehicle front panel or on a video camera of the vehicle and said remote monitor unit for transmitting an alarm signal and video images to said 24 hour emergency alarm station when a switch is actuated manually by an individual of the vehicle upon an attempted carjacking or emergency situation;

g) control means operatively associated with scanning video cameras of the vehicle to control timing and rotations of the scanning video cameras when at least one vehicle sensor is triggered by sensing an attempted vehicle theft condition;

h) track mechanism means associated with vehicle causing video cameras of the vehicle to rotate to provide a 360 degree view of conditions surrounding the cameras; and i) video monitor means operatively associated with said emergency alarm device capable of receiving alarm signals and video images and tracking information from the vehicle at a remote site;

j) said remote monitor unit capable of being located in proximity to an individual having responsibility for monitoring a potential theft or vandalism condition of the vehicle.

2. The automotive vehicle anti-theft anti-vandalism and anti-carjacking system of the claim 1 further characterized in that the emergency alarm device means comprises operating off the vehicle electrical circuitry.

3. The automotive vehicle anti-theft anti-vandalism and anti-carjacking system of claim 1 further characterized in that the emergency alarm device will generate a display at one of the video monitors.

4. The automotive vehicle anti-theft anti-vandalism and anti-carjacking system of claim 1 further characterized in that the video monitors operate off an electrical system of 24 hour emergency alarm station.

5. The automotive vehicle anti-theft-vandalism and anti-carjacking system of claim 1 further characterized in that track mechanism means form part of the system and which tracking is caused only by an individual of the vehicle manually actuating the emergency alarm device by switching means.

6. The automotive vehicle anti-theft anti-vandalism and anti-carjacking system of claim 1 further characterized in that manually actuating is done by an individual of the vehicle with on hands operation of the emergency alarm device.

7. The automotive vehicle anti-theft anti-vandalism and anti-carjacking system of claim 1 further characterized in that the video means and emergency alarm device and tracking mechanism are operable when a vehicle is in moving position.

* * * * *

UNITED STATES PATENT AND TRADEMARK OFFICE
CERTIFICATE OF CORRECTION

PATENT NO.   : 6,002,326
DATED        : December 14, 1999
INVENTOR(S)  : Valerie Jean Turner It is certified that error appears in the above-identified patent and that said Letters Patent is hereby corrected as shown below:

Column 9,
Line 31, after "vehicle" insert -- which receives video images and an alarm signal when at least one vehicle sensor is triggered by sensing an attempted vehicle theft condition. --

Column 10,
Line 29, after "in" insert -- both --;
Line 30, after "moving" insert -- and standstill --

Signed and Sealed this

Twenty-eighth Day of August, 2001

*Attest:*

NICHOLAS P. GODICI
*Attesting Officer*      *Acting Director of the United States Patent and Trademark Office*